United States Patent
Jackowski et al.

(10) Patent No.: US 10,105,845 B1
(45) Date of Patent: Oct. 23, 2018

(54) MODULAR ROBOT SYSTEM

(71) Applicant: Boston Dynamics, Inc., Waltham, MA (US)

(72) Inventors: Zachary John Jackowski, Somerville, MA (US); John Aaron Saunders, Arlington, MA (US); Benjamin Swilling, Waltham, MA (US)

(73) Assignee: Boston Dynamics, Inc., Waltham, MA (US)

( * ) Notice: Subject to any disclaimer, the term of this patent is extended or adjusted under 35 U.S.C. 154(b) by 8 days.

(21) Appl. No.: 15/016,727

(22) Filed: Feb. 5, 2016

(51) Int. Cl.
*B25J 9/08* (2006.01)
*B25J 9/14* (2006.01)
*B25J 9/16* (2006.01)

(52) U.S. Cl.
CPC ............ *B25J 9/1664* (2013.01); *B25J 9/08* (2013.01); *B25J 9/14* (2013.01); *Y10S 901/01* (2013.01); *Y10S 901/02* (2013.01); *Y10S 901/22* (2013.01)

(58) Field of Classification Search
CPC ....... B25J 9/08; B25J 9/14; B25J 15/04; B25J 15/0408; B25J 15/0466; B25J 15/0483; B25J 15/0491; B25J 15/0475; Y10S 901/01; Y10S 901/02; Y10S 901/22; G05B 19/4148; G05B 2219/25314; G05B 19/41845; G05B 23/0213
See application file for complete search history.

(56) References Cited

U.S. PATENT DOCUMENTS

| 3,247,978 | A | * | 4/1966 | Neumeier | B25J 5/04 414/591 |
| 4,620,362 | A | * | 11/1986 | Reynolds | B25J 15/04 279/900 |
| 4,621,398 | A | * | 11/1986 | Kleiman | B05B 13/0431 29/264 |
| 4,784,421 | A | | 11/1988 | Alvite | |
| 5,685,383 | A | | 11/1997 | Ferrante | |
| 5,963,712 | A | * | 10/1999 | Fujita | B25J 9/1615 318/568.12 |
| 6,421,585 | B1 | * | 7/2002 | Takamura | B25J 9/08 318/800 |

(Continued)

FOREIGN PATENT DOCUMENTS

WO WO 2014/125360 A1 8/2014

*Primary Examiner* — Stephen Holwerda
(74) *Attorney, Agent, or Firm* — Honigman Miller Schwartz and Cohn LLP

(57) ABSTRACT

A robotic system includes a body including at least one attachment mechanism configured to removably couple a modular component to the body. The modular component includes at least one movable part operable to move relative to the body when the modular component is attached to the body. The system includes a communication interface coupled to the body and configured to be communicatively coupled to the modular component to receive information relating to the modular component and operation of the at least one movable part. The system includes a control system coupled to the body and the communication interface. The control system is configured to: in response to the modular component being attached to the body, receive the information from the modular component by way of the communication interface, and operate the at least one movable part of the modular component according to the information.

20 Claims, 10 Drawing Sheets

(56) References Cited

U.S. PATENT DOCUMENTS

| | | |
|---|---|---|
| 6,938,938 B2 | 9/2005 | Risle et al. |
| 8,516,918 B2 | 8/2013 | Jacobsen et al. |
| 2005/0033477 A1* | 2/2005 | Friedman ......... G05B 19/41865 700/264 |
| 2005/0065647 A1* | 3/2005 | Perry ...................... B25J 9/161 700/245 |
| 2009/0044655 A1* | 2/2009 | DeLouis .................. B25J 15/04 74/490.05 |
| 2010/0009825 A1* | 1/2010 | Norton ..................... B25J 15/04 483/58 |

\* cited by examiner

MODULAR ROBOT SYSTEM

BACKGROUND

Robots may be assembled from various mechanical and electrical components. Due to the number and variety of components, the process of assembling the components may be extremely complex. In addition, once the components have been assembled, maintaining, repairing, or replacing individual components may be very difficult. Indeed, a robot may need to be substantially disassembled to maintain, repair, or replace a single component. Furthermore, the complex assembly of components may not allow the robot to be easily reconfigured with different components.

SUMMARY

Components for a robot may be produced separately as modular units and subsequently assembled to produce the robot. Attachment mechanisms allow the modular components to be easily coupled to, or decoupled from, other parts of the robot assembly. In addition, connectors allow electric, hydraulic, and/or other connections to be easily established between the modular components and other parts of the robot assembly.

When a modular component is coupled to another part of the robot assembly, a control system for the robot can identify the modular component and configure the operation of the robot according to the characteristics of the component. For instance, a modular leg-pair may electronically store information relating to the operation of the leg-pair. Such information may include kinematic information, calibration data, motion limits, and/or strength limits for the leg-pair. The control system may be communicatively coupled to the modular leg-pair to receive this information and configure the robot according to this information.

Once the modular components have been assembled to produce the robot, the modular components can be easily decoupled from the robot assembly for maintenance, repair, and/or replacement. In some cases, system faults can be more easily isolated to a particular modular component. The faulty modular component can be easily removed from the robot assembly and then repaired and/or replaced with another working modular component.

Furthermore, a modular approach to robot assembly allows a robot to be customized for specific jobs, because the robot can be easily modified to use modular components having desired characteristics. When a modular component is replaced, the control system for the robot can identify the replacement modular component and configure the operation of the robot according to the characteristics of the replacement modular component.

According to an example implementation, a robotic system includes a body including at least one attachment mechanism. The at least one attachment mechanism is configured to removably couple a modular component to the body. The modular component includes at least one movable part operable to move relative to the body when the modular component is attached to the body. The robotic system also includes a communication interface coupled to the body and configured to be communicatively coupled to the modular component to receive, from the modular component, information relating to the modular component and operation of the at least one movable part. Additionally, the robotic system includes a control system coupled to the body and the communication interface. The control system is configured to: in response to the modular component being attached to the body by way of the at least one attachment mechanism, receive, by way of the communication interface, the information from the modular component, and operate the at least one movable part of the modular component according to the information.

According to another example implementation, a modular component includes an attachment mechanism configured to removably couple the modular component to a body of a robotic system. The modular component also includes at least one movable part operable to move relative to the body of the robotic system when the modular component is attached to the body. Additionally, the modular component includes a communication interface configured to be communicatively coupled to the robotic system. The modular component is configured to: in response to being attached to the body of the robotic system, transmit, by way of the communication interface, information relating to the modular component and operation of the at least one movable part to the body of the robotic system, receive, by way of the communication interface, operational instructions from the body of the robotic device, and operate according to the received instructions.

According to yet another example implementation, a method includes engaging, by way of a first attachment mechanism on a body of a robotic system, a first modular component including at least one first movable part operable to move relative to the body when the first modular component is attached to the body. The method also includes receiving, from the first modular component and by way of a first communication interface coupled to the body of the robotic system, first information relating to the first modular component and operation of the at least one first movable part. Additionally, the method includes operating, by the robotic system, the at least one first movable part of the first modular component according to the first information, wherein the operation involves movement of the first movable part of the first modular component.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
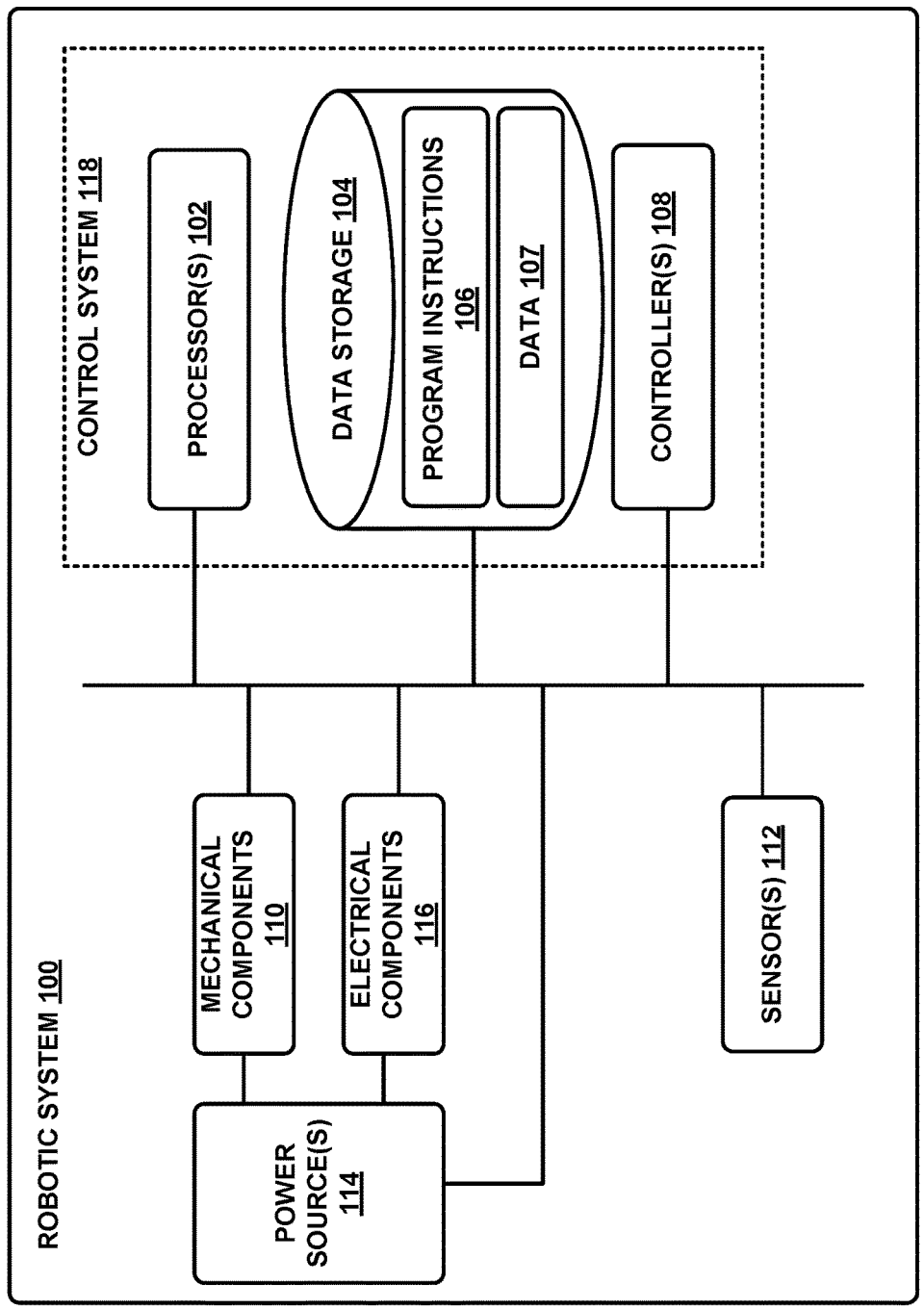
FIG. 1 illustrates a configuration of a robotic system according to an example implementation.

The following detailed description describes various features and functions of the disclosed systems and methods with reference to the accompanying figures. The illustrative system and method embodiments described herein are not meant to be limiting. It will be readily understood that certain aspects of the disclosed systems and methods can be arranged and combined in a wide variety of different configurations, all of which are contemplated herein.

I. Overview

A robot may be assembled from various mechanical and electrical components. Using a modular approach, the components may be produced separately as individual units and subsequently assembled to produce the robot. For instance, two modular leg-pairs may be produced separately and subsequently coupled to a robot body with other modular components to produce a quadruped robot.

Attachment mechanisms allow the modular components to be easily coupled to, or decoupled from, other parts of the robot assembly. In addition, connectors allow electric, hydraulic, optical, and/or other connections to be easily established between the modular components and other parts of the robot assembly. For instance, modular leg-pairs for a robot may be operated with hydraulic power. Accordingly, each modular leg-pair may include a hydraulic connector that allows the leg-pair to be easily coupled to, or decoupled from, a hydraulic system in the robot assembly.

When a modular component is coupled to another part of the robot assembly, a control system for the robot can identify the modular component and configure the operation of the robot according to the characteristics of the component. For instance, a modular leg-pair may electronically store information relating to the operation of the leg-pair. Such information may include kinematic information, calibration data, motion limits, and/or strength limits for the leg-pair. The control system may be communicatively coupled to the modular leg-pair to receive this information and configure the robot according to this information.

Once the modular components have been assembled to produce the robot, the modular components can be easily removed from the robot assembly for maintenance, repair, and/or replacement. For instance, system faults can be more easily isolated to a particular modular component. The faulty modular component can be easily removed from the robot assembly and then repaired and/or replaced with another working modular component.

Furthermore, a modular approach allows a robot to be customized for specific jobs, because the robot can be easily modified to use modular components having desired characteristics. For instance, a modular leg-pair in a robot assembly may be replaced with another modular leg-pair with greater load-bearing capabilities and/or different range of motion. When a modular component is replaced, the control system for the robot can identify the replacement modular component and configure the operation of the robot according to the characteristics of the replacement modular component.

II. Example Robotic Systems

FIG. 1 illustrates an example configuration of a robotic system that may be used in connection with the implementations described herein. The robotic system 100 may be configured to operate autonomously, semi-autonomously, and/or using directions provided by user(s). The robotic system 100 may be implemented in various forms, such as a biped robot, quadruped robot, or some other arrangement. Furthermore, the robotic system 100 may also be referred to as a robot, robotic device, or mobile robot, among other designations.

As shown in FIG. 1, the robotic system 100 may include processor(s) 102, data storage 104, and controller(s) 108, which together may be part of a control system 118. The robotic system 100 may also include sensor(s) 112, power source(s) 114, mechanical components 110, and electrical components 116. Nonetheless, the robotic system 100 is shown for illustrative purposes, and may include more or fewer components. The various components of robotic system 100 may be connected in any manner, including wired or wireless connections. Further, in some examples, components of the robotic system 100 may be distributed among multiple physical entities rather than a single physical entity. Other example illustrations of robotic system 100 may exist as well.

Processor(s) 102 may operate as one or more general-purpose hardware processors or special purpose hardware processors (e.g., digital signal processors, application specific integrated circuits, etc.). The processor(s) 102 may be configured to execute computer-readable program instructions 106, and manipulate data 107, both of which are stored in the data storage 104. The processor(s) 102 may also directly or indirectly interact with other components of the robotic system 100, such as sensor(s) 112, power source(s) 114, mechanical components 110, and/or electrical components 116.

The data storage 104 may be one or more types of hardware memory. For example, the data storage 104 may include or take the form of one or more computer-readable storage media that can be read or accessed by processor(s) 102. The one or more computer-readable storage media can include volatile and/or non-volatile storage components, such as optical, magnetic, organic, or another type of memory or storage, which can be integrated in whole or in part with processor(s) 102. In some implementations, the data storage 104 can be a single physical device. In other implementations, the data storage 104 can be implemented using two or more physical devices, which may communicate with one another via wired or wireless communication. As noted previously, the data storage 104 may include the computer-readable program instructions 106 and the data 107. The data 107 may be any type of data, such as configuration data, sensor data, and/or diagnostic data, among other possibilities.

The controller 108 may include one or more electrical circuits, units of digital logic, computer chips, and/or microprocessors that are configured to (perhaps among other tasks), interface between any combination of the mechanical components 110, the sensor(s) 112, the power source(s) 114, the electrical components 116, the control system 118, and/or a user of the robotic system 100. In some implementations, the controller 108 may be a purpose-built embedded device for performing specific operations with one or more subsystems of the robotic device 100.

The control system 118 may monitor and physically change the operating conditions of the robotic system 100. In doing so, the control system 118 may serve as a link between portions of the robotic system 100, such as between mechanical components 110 and/or electrical components 116. In some instances, the control system 118 may serve as an interface between the robotic system 100 and another computing device. Further, the control system 118 may serve as an interface between the robotic system 100 and a user. The instance, the control system 118 may include various components for communicating with the robotic system 100, including a joystick, buttons, and/or ports, etc. The example interfaces and communications noted above may be implemented via a wired or wireless connection, or both. The control system 118 may perform other operations for the robotic system 100 as well.

During operation, the control system 118 may communicate with other systems of the robotic system 100 via wired or wireless connections, and may further be configured to communicate with one or more users of the robot. As one possible illustration, the control system 118 may receive an input (e.g., from a user or from another robot) indicating an instruction to perform a particular gait in a particular direction, and at a particular speed. A gait is a pattern of movement of the limbs of an animal, robot, or other mechanical structure.

Based on this input, the control system 118 may perform operations to cause the robotic device 100 to move according to the requested gait. As another illustration, a control system may receive an input indicating an instruction to move to a particular geographical location. In response, the control system 118 (perhaps with the assistance of other components or systems) may determine a direction, speed, and/or gait based on the environment through which the robotic system 100 is moving en route to the geographical location.

Operations of the control system 118 may be carried out by the processor(s) 102. Alternatively, these operations may be carried out by the controller 108, or a combination of the processor(s) 102 and the controller 108. In some implementations, the control system 118 may partially or wholly reside on a device other than the robotic system 100, and therefore may at least in part control the robotic system 100 remotely.

Mechanical components 110 represent hardware of the robotic system 100 that may enable the robotic system 100 to perform physical operations. As a few examples, the robotic system 100 may include physical members such as leg(s), arm(s), and/or wheel(s). The physical members or other parts of robotic system 100 may further include actuators arranged to move the physical members in relation to one another. The robotic system 100 may also include one or more structured bodies for housing the control system 118 and/or other components, and may further include other types of mechanical components. The particular mechanical components 110 used in a given robot may vary based on the design of the robot, and may also be based on the operations and/or tasks the robot may be configured to perform.

In some examples, the mechanical components 110 may include one or more removable components. The robotic system 100 may be configured to add and/or remove such removable components, which may involve assistance from a user and/or another robot. For example, the robotic system 100 may be configured with removable arms, hands, feet, and/or legs, so that these appendages can be replaced or changed as needed or desired. In some implementations, the robotic system 100 may include one or more removable and/or replaceable battery units or sensors. Other types of removable components may be included within some implementations.

The robotic system 100 may include sensor(s) 112 arranged to sense aspects of the robotic system 100. The sensor(s) 112 may include one or more force sensors, torque sensors, velocity sensors, acceleration sensors, position sensors, proximity sensors, motion sensors, location sensors, load sensors, temperature sensors, touch sensors, depth sensors, ultrasonic range sensors, infrared sensors, object sensors, and/or cameras, among other possibilities. Within some examples, the robotic system 100 may be configured to receive sensor data from sensors that are physically separated from the robot (e.g., sensors that are positioned on other robots or located within the environment in which the robot is operating).

The sensor(s) 112 may provide sensor data to the processor(s) 102 (perhaps by way of data 107) to allow for interaction of the robotic system 100 with its environment, as well as monitoring of the operation of the robotic system 100. The sensor data may be used in evaluation of various factors for activation, movement, and deactivation of mechanical components 110 and electrical components 116 by control system 118. For example, the sensor(s) 112 may capture data corresponding to the terrain of the environment or location of nearby objects, which may assist with environment recognition and navigation. In an example configuration, sensor(s) 112 may include RADAR (e.g., for long-range object detection, distance determination, and/or speed determination), LIDAR (e.g., for short-range object detection, distance determination, and/or speed determination), SONAR (e.g., for underwater object detection, distance determination, and/or speed determination), VICON® (e.g., for motion capture), one or more cameras (e.g., stereoscopic cameras for 3D vision), a global positioning system (GPS) transceiver, and/or other sensors for capturing information of the environment in which the robotic system 100 is operating. The sensor(s) 112 may monitor the environment in real time, and detect obstacles, elements of the terrain, weather conditions, temperature, and/or other aspects of the environment.

Further, the robotic system 100 may include sensor(s) 112 configured to receive information indicative of the state of the robotic system 100, including sensor(s) 112 that may monitor the state of the various components of the robotic system 100. The sensor(s) 112 may measure activity of systems of the robotic system 100 and receive information based on the operation of the various features of the robotic system 100, such the operation of extendable legs, arms, or other mechanical and/or electrical features of the robotic system 100. The data provided by the sensor(s) 112 may enable the control system 118 to determine errors in operation as well as monitor overall operation of components of the robotic system 100.

As an example, the robotic system 100 may use force sensors to measure load on various components of the robotic system 100. In some implementations, the robotic system 100 may include one or more force sensors on an arm or a leg to measure the load on the actuators that move one or more members of the arm or leg. As another example, the robotic system 100 may use one or more position sensors to sense the position of the actuators of the robotic system. For instance, such position sensors may sense states of extension, retraction, or rotation of the actuators on arms or legs.

As another example, the sensor(s) 112 may include one or more velocity and/or acceleration sensors. For instance, the sensor(s) 112 may include an inertial measurement unit (IMU). The IMU may sense velocity and acceleration in the world frame, with respect to the gravity vector. The velocity and acceleration sensed by the IMU may then be translated to that of the robotic system 100 based on the location of the IMU in the robotic system 100 and the kinematics of the robotic system 100.

The robotic system 100 may include other types of sensors not explicated discussed herein. Additionally or alternatively, the robotic system may use particular sensors for purposes not enumerated herein.

The robotic system 100 may also include one or more power source(s) 114 configured to supply power to various components of the robotic system 100. Among other possible power systems, the robotic system 100 may include a hydraulic system, electrical system, batteries, and/or other types of power systems. As an example illustration, the robotic system 100 may include one or more batteries configured to provide charge to components of the robotic system 100. Some of the mechanical components 110 and/or electrical components 116 may each connect to a different power source, may be powered by the same power source, or be powered by multiple power sources.

Any type of power source may be used to power the robotic system 100, such as electrical power or a gasoline engine. Additionally or alternatively, the robotic system 100 may include a hydraulic system configured to provide power to the mechanical components 110 using fluid power. Components of the robotic system 100 may operate based on hydraulic fluid being transmitted throughout the hydraulic system to various hydraulic motors and hydraulic cylinders, for example. The hydraulic system may transfer hydraulic power by way of pressurized hydraulic fluid through tubes, flexible hoses, or other links between components of the robotic system 100. The power source(s) 114 may charge using various types of charging, such as wired connections to an outside power source, wireless charging, combustion, or other examples.

The electrical components 116 may include various mechanisms capable of processing, transferring, and/or providing electrical charge or electric signals. Among possible examples, the electrical components 116 may include electrical wires, circuitry, and/or wireless communication transmitters and receivers to enable operations of the robotic system 100. The electrical components 116 may interwork with the mechanical components 110 to enable the robotic system 100 to perform various operations. The electrical components 116 may be configured to provide power from the power source(s) 114 to the various mechanical components 110, for example. Further, the robotic system 100 may include electric motors. Other examples of electrical components 116 may exist as well.

Although not shown in FIG. 1, the robotic system 100 may include a body, which may connect to or house appendages and components of the robotic system. As such, the structure of the body may vary within examples and may further depend on particular operations that a given robot may have been designed to perform. For example, a robot developed to carry heavy loads may have a wide body that enables placement of the load. Similarly, a robot designed to reach high speeds may have a narrow, small body that does not have substantial weight. Further, the body and/or the other components may be developed using various types of materials, such as metals or plastics. Within other examples, a robot may have a body with a different structure or made of various types of materials.

The body and/or the other components may include or carry the sensor(s) 112. These sensors may be positioned in various locations on the robotic device 100, such as on the body and/or on one or more of the appendages, among other examples.

On its body, the robotic device 100 may carry a load, such as a type of cargo that is to be transported. The load may also represent external batteries or other types of power sources (e.g., solar panels) that the robotic device 100 may utilize. Carrying the load represents one example use for which the robotic device 100 may be configured, but the robotic device 100 may be configured to perform other operations as well.

As noted above, the robotic system 100 may include various types of legs, arms, wheels, and so on. In general, the robotic system 100 may be configured with zero or more legs. An implementation of the robotic system with zero legs may include wheels, treads, or some other form of locomotion. An implementation of the robotic system with two legs may be referred to as a biped, and an implementation with four legs may be referred as a quadruped. Implementations with six or eight legs are also possible. For purposes of illustration, biped and quadruped implementations of the robotic system 100 are described below.

Figure 2:
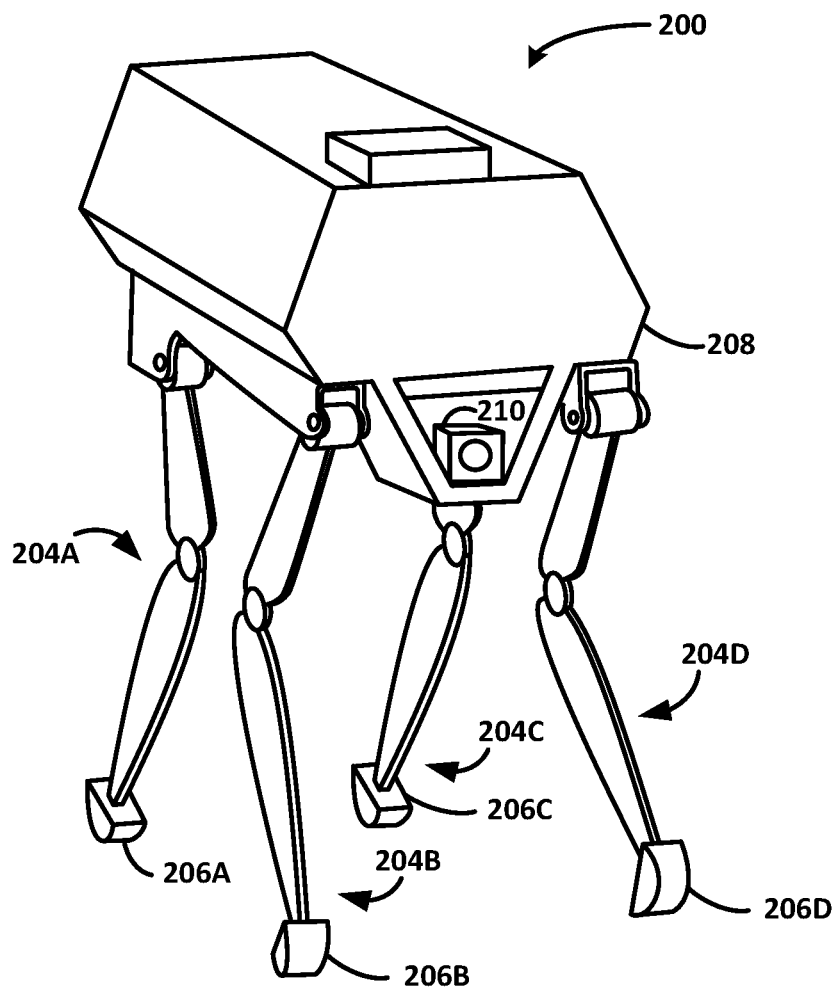
FIG. 2 illustrates a quadruped robot according to an example implementation.

FIG. 2 illustrates a quadruped robot 200, according to an example implementation. Among other possible features, the robot 200 may be configured to perform some of the operations described herein. The robot 200 includes a control system, and legs 204A, 204B, 204C, 204D connected to a body 208. Each leg may include a respective foot 206A, 206B, 206C, 206D that may contact a surface (e.g., a ground surface). Further, the robot 200 is illustrated with sensor(s) 210, and may be capable of carrying a load on the body 208. Within other examples, the robot 200 may include more or fewer components, and thus may include components not shown in FIG. 2.

The robot 200 may be a physical representation of the robotic system 100 shown in FIG. 1, or may be based on other configurations. Thus, the robot 200 may include one or more of mechanical components 110, sensor(s) 112, power source(s) 114, electrical components 116, and/or control system 118, among other possible components or systems.

The configuration, position, and/or structure of the legs 204A-204D may vary in example implementations. The legs 204A-204D enable the robot 200 to move relative to its environment, and may be configured to operate in multiple degrees of freedom to enable different techniques of travel. In particular, the legs 204A-204D may enable the robot 200 to travel at various speeds according to the mechanics set forth within different gaits. The robot 200 may use one or more gaits to travel within an environment, which may involve selecting a gait based on speed, terrain, the need to maneuver, and/or energy efficiency.

Further, different types of robots may use different gaits due to variations in design. Although some gaits may have specific names (e.g., walk, trot, run, bound, gallop, etc.), the distinctions between gaits may overlap. The gaits may be classified based on footfall patterns—the locations on a surface for the placement the feet 206A-206D. Similarly, gaits may also be classified based on ambulatory mechanics.

The body 208 of the robot 200 connects to the legs 204A-204D and may house various components of the robot 200. For example, the body 208 may include or carry sensor(s) 210. These sensors may be any of the sensors discussed in the context of sensor(s) 112, such as a camera, LIDAR, or an infrared sensor. Further, the locations of sensor(s) 210 are not limited to those illustrated in FIG. 2. Thus, sensor(s) 210 may be positioned in various locations on the robot 200, such as on the body 208 and/or on one or more of the legs 204A-204D, among other examples.

Figure 3:
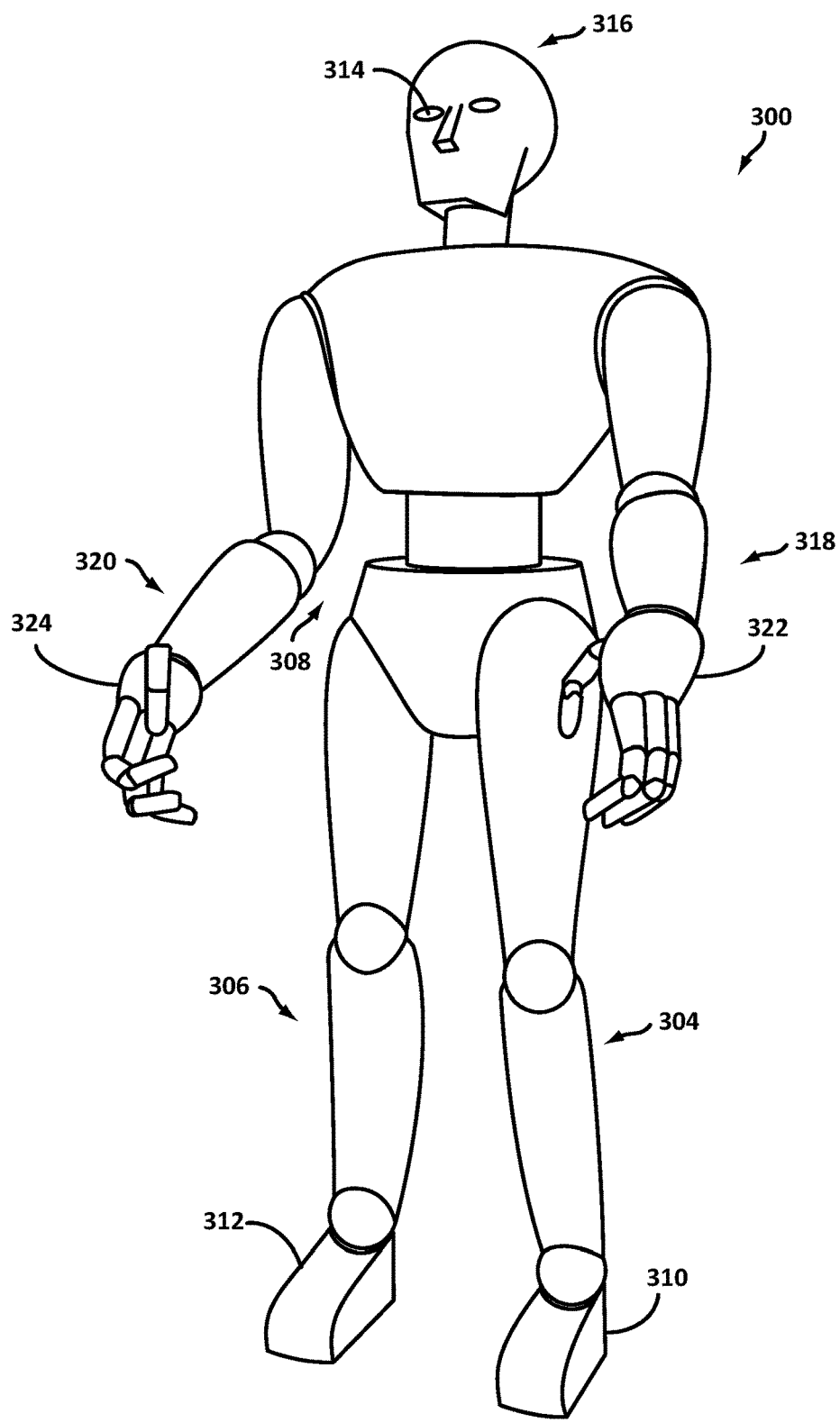
FIG. 3 illustrates a biped robot according to an example implementation.

FIG. 3 illustrates a biped robot 300 according to another example implementation. Similar to robot 200, the robot 300 may correspond to the robotic system 100 shown in FIG. 1, and may be configured to perform some of the implementations described herein. Thus, like the robot 200, the robot 300 may include one or more of mechanical components 110, sensor(s) 112, power source(s) 114, electrical components 116, and/or control system 118.

For example, the robot 300 may include legs 304 and 306 connected to a body 308. Each leg may consist of one or more members connected by joints and configured to operate with various degrees of freedom with respect to one another. Each leg may also include a respective foot 310 and 312, which may contact a surface (e.g., the ground surface). Like the robot 200, the legs 304 and 306 may enable the robot 300 to travel at various speeds according to the mechanics set forth within gaits. The robot 300, however, may utilize different gaits from that of the robot 200, due at least in part to the differences between biped and quadruped capabilities.

The robot 300 may also include arms 318 and 320. These arms may facilitate object manipulation, load carrying, and/or balancing for the robot 300. Like legs 304 and 306, each arm may consist of one or more members connected by joints and configured to operate with various degrees of freedom with respect to one another. Each arm may also include a respective hand 322 and 324. The robot 300 may use hands 322 and 324 for gripping, turning, pulling, and/or pushing objects. The hands 322 and 324 may include various types of appendages or attachments, such as fingers, grippers, welding tools, cutting tools, and so on.

The robot 300 may also include sensor(s) 314, corresponding to sensor(s) 112, and configured to provide sensor data to its control system. In some cases, the locations of these sensors may be chosen in order to suggest an anthropomorphic structure of the robot 300. Thus, as illustrated in FIG. 3, the robot 300 may contain vision sensors (e.g., cameras, infrared sensors, object sensors, range sensors, etc.) within its head 316.

III. Example Modular Robot

Figure 4:
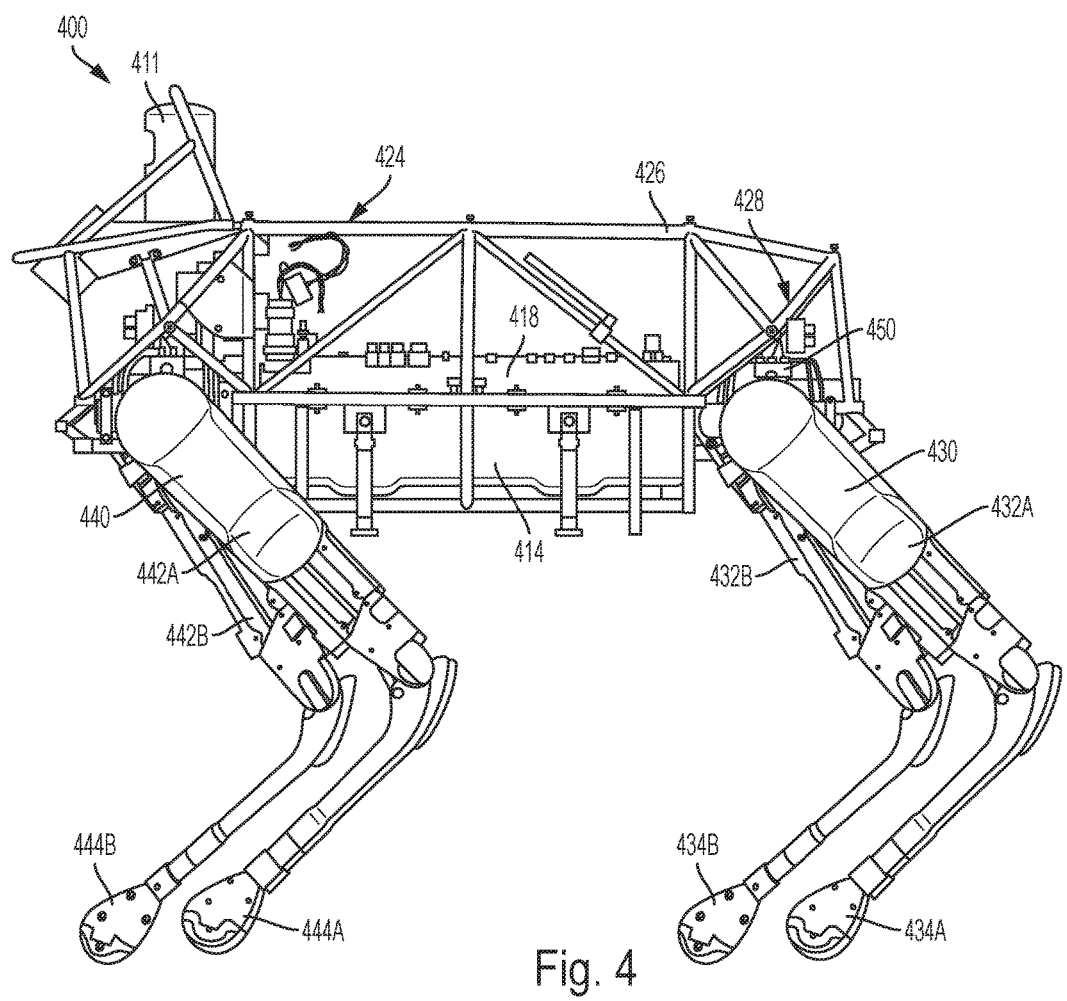
FIG. 4 illustrates a quadruped robot assembled from modular components according to an example implementation.
Figure 5:
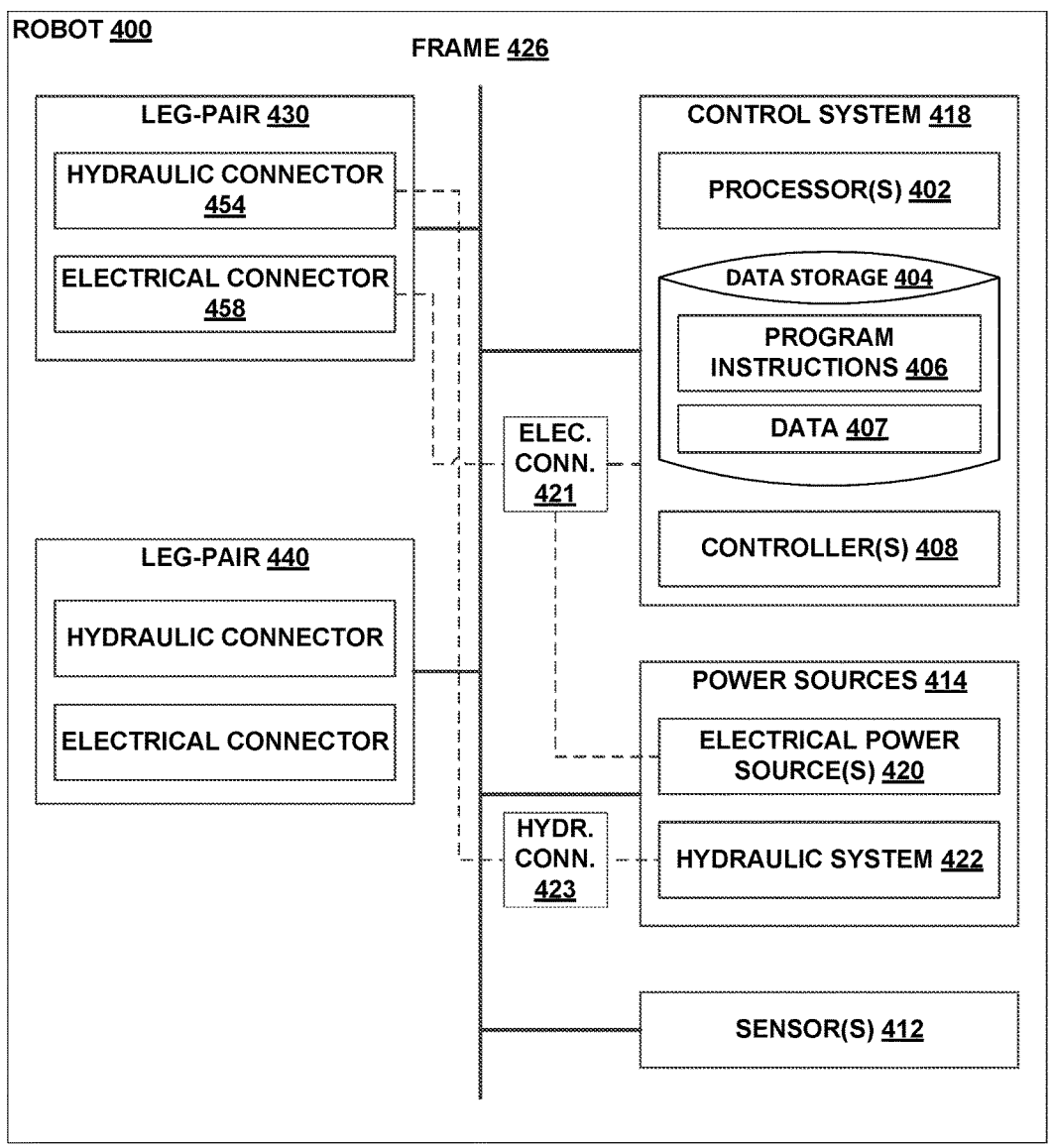
FIG. 5 illustrates further aspects of a quadruped robot, including a control system, according to an example implementation.

FIGS. 4 and 5 illustrate an example robot 400 that is assembled from different modular components. The robot 400 may include aspects of the robotic system 100 described above. For instance, as FIG. 5 illustrates, the robot 400 may include a control system 418, which may be similar to the control system 118 of the robotic system 100. In particular, the control system 418 may include processor(s) 402 and controller(s) 408 that allow the control system 418 to monitor and control the operation of other components of the robot 400. The processor(s) 402 may be configured to execute computer-readable program instructions 406 and process data 407. The program instructions 406 and data 407 may be stored on data storage 404, which includes computer-readable storage media.

The robot 400 may also include sensor(s) 412. The control system 418 may process data from the sensor(s) 412 to control the interaction between the robot 400 and its environment and to monitor the operation of other components of the robot 400. The sensor(s) 412 may include any one or more of the sensors 112 of the robotic system 100. As FIG. 4 illustrates, some sensor(s) 412 may be disposed in a sensor head 411. The sensors 412, however, may be positioned in various locations on the robot 400.

Additionally, the robot 400 may include power source(s) 414, which may include any one or more of the power sources 114 of the robotic system 100. For instance, the power source(s) 414 may include electrical power source(s) 420, such as a battery, which are configured to provide electrical power to components.

Furthermore, the power source(s) 414 may include a hydraulic system 422 configured to provide hydraulic power to components. Components of the robot 400 may operate based on hydraulic fluid being transmitted throughout the hydraulic system 422 to various hydraulic motors and hydraulic cylinders. The hydraulic system 422 may transfer hydraulic power by way of pressurized hydraulic fluid through tubes, flexible hoses, or other links between components of the robot 400.

The robot includes a body 424 that includes a frame 426 and other structures for supporting various components of the robot 400 and other loads. As shown in FIG. 4, the frame 426 supports the control system 418, the sensor head 411, and the power source(s) 414. The control system 418, the sensor head 411, and each power source 414 (e.g., the electrical power source(s) 420, the hydraulic system 422) can be separately produced as single modular components and subsequently coupled to the frame 426 when assembling the robot 400. These modular components may include attachment mechanism(s) that allow the modular components to be easily coupled to, and decoupled from, the frame 426.

The robot 400 may include a first leg-pair 430 and a second leg-pair 440. The leg-pairs 430, 440 can also be produced separately as modular components and subsequently coupled to the frame 426. The first leg-pair 430 includes a first leg 432A and a second leg 432B. Similarly, the second leg-pair 440 includes a first leg 442A and a second leg 442B. Thus, with the two leg-pairs 430 and 440, the robot 400 operates as a quadruped.

Each leg 432A, 432B, 442A, 442B may include one or more members connected by joints and configured to operate with various degrees of freedom with respect to one another. Each leg 432A, 432B, 442A, 442B may be actuated by pushing and pulling on the various members.

Additionally, for the first leg-pair 430, the first leg 432A includes a foot 434A and the second leg 432B includes a foot 434B. Similarly, for the second leg-pair 440, the first leg 442A includes a foot 444A and the second leg 432B includes a foot 444B. Each foot 434A, 434B, 444A, 444B may contact a surface (e.g., a ground surface). As such, the legs 432A, 432B, 442A, 442B can balance the robot 400 on the surface. Although the leg-pairs 430, 440 may be illustrated with respective feet 434A-B, 444A-B, alternative embodiments may employ other end structures, such as wheels, treads, etc.

Additionally, the legs 432A, 432B, 442A, 442B are operable to move the robot 400 along the surface. To actuate movement, hydraulic power from the hydraulic system 422 may be delivered to each leg 432A, 432B, 442A, 442B to selectively push and pull on the members that form each leg 432A, 432B, 442A, 442B. Correspondingly, the legs 432A, 432B, 442A, 442B move relative to the body 424 and to each other to establish a gait for the robot 400. The control system 418 can control the hydraulic power delivered to the members of the legs 432A, 432B, 442A, 442B to move the robot 400 at selected speeds and according to selected gaits.

Figure 6:
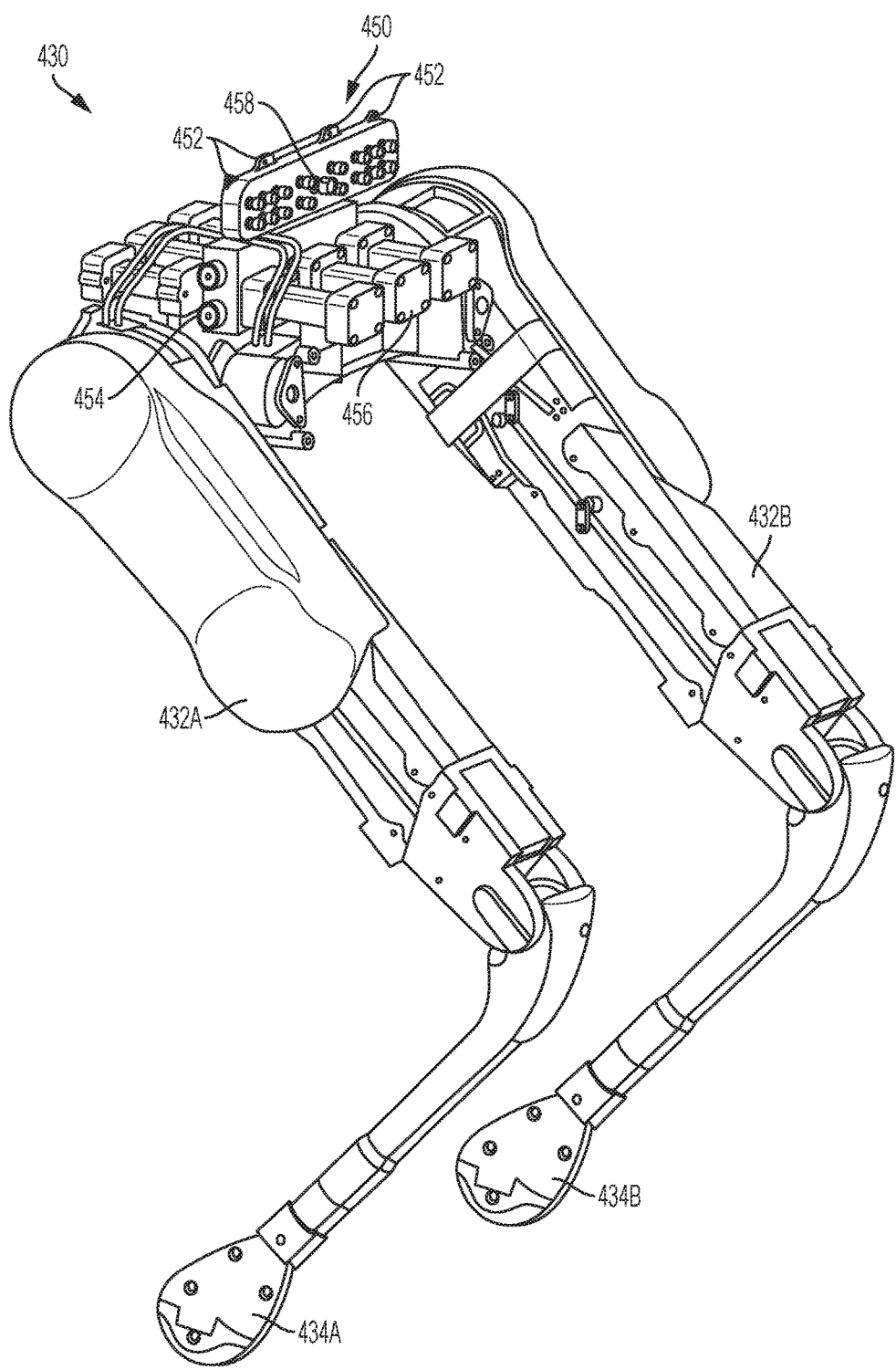
FIG. 6 illustrates a modular leg-pair component for a robot according to an example implementation.
Figure 7:
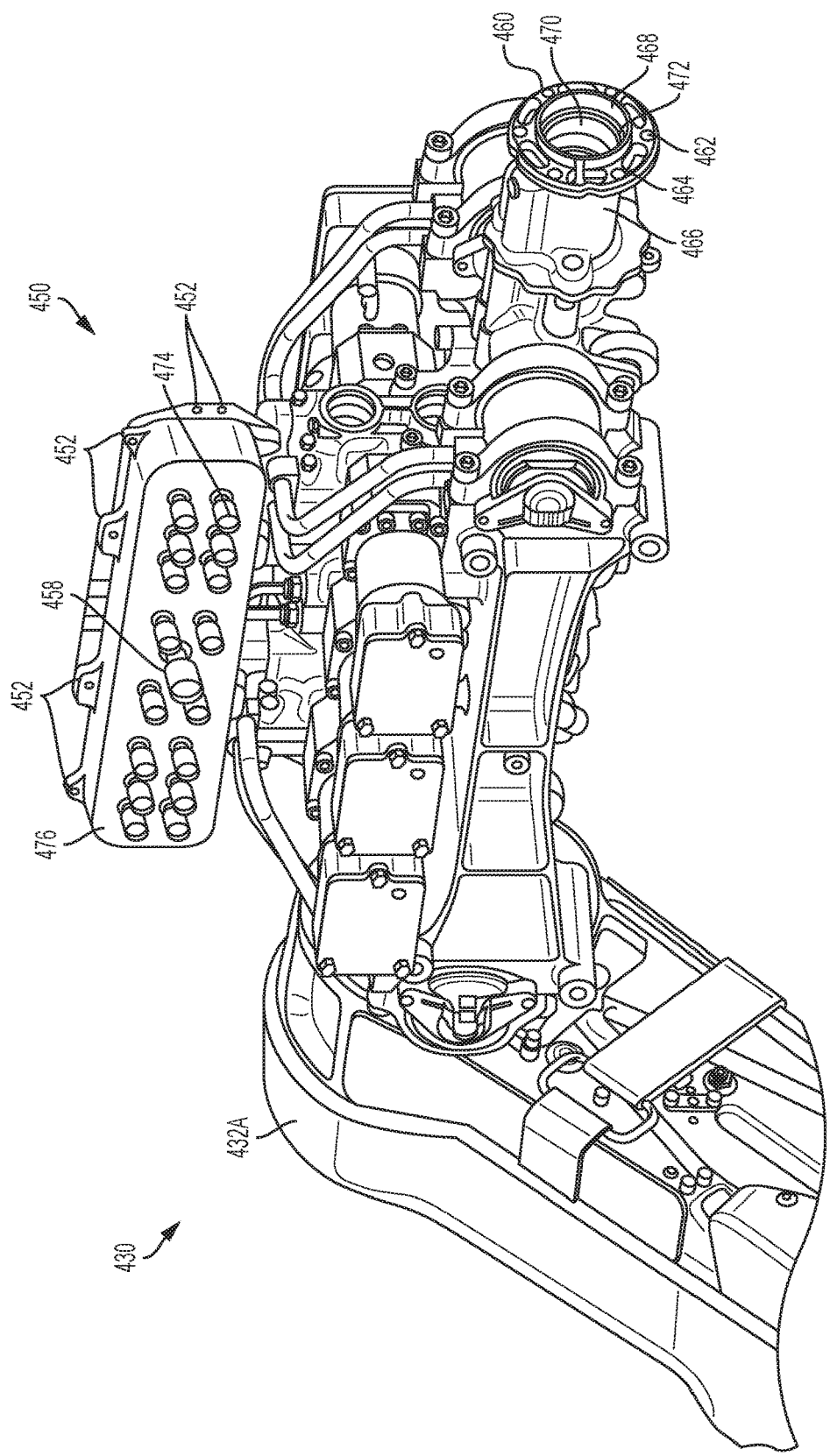
FIG. 7 illustrates further aspects of a modular leg-pair component wherein a central node of the modular leg-pair component is configured to receive a modular leg component according to an example implementation.

The first leg-pair 430 and the second leg-pair 440 may be assembled according to a similar process, so for the sake of convenience, FIGS. 6-7 only illustrate the first leg-pair 430. It is understood, however, that the description for the first leg-pair 430 may also apply to the second leg-pair 440. As shown in FIG. 6, the first leg-pair 430 may be assembled by coupling the first leg 432A and the second leg 432B to opposing sides of a central node 450. The central node 450 may be coupled to the frame 426 of the robot 400 as illustrated in FIG. 4. As such, the legs 432A, 432B are coupled to the frame 426 by way of the central node 450.

The frame 426 and the central node 450 may employ corresponding attachment mechanisms that allow the central node 450 to be easily coupled to, and decoupled from, the frame 426. The attachment mechanisms also provide a secure coupling that allows the leg-pair 430 to help support the body 424, especially as the body 424 moves and/or experiences external loads. For instance, as shown in FIGS. 4 and 6, the central node 450 includes apertures 452 that may be aligned with corresponding apertures 428 on the frame 426. The apertures 428, 452 may be configured to receive fasteners, such as bolts, screws, pins, or the like, to allow the central node 450 to be removably coupled to the frame 426.

As described above, hydraulic power may be employed to operate the legs 432A, 432B. As shown in FIGS. 5-6, the central node 450 may also include a hydraulic connector 454 that can be removably coupled to a hydraulic connector 423 for the hydraulic system 422. Hydraulic fluid from the hydraulic system 422 thus applies pressure in the central node 450. The hydraulic connectors 423, 454 may include one or more valve mechanisms to prevent hydraulic fluid from leaking during coupling or decoupling.

The leg-pair 430 may also include hydraulic pressure sensor(s) 456 that measure the pressure of hydraulic fluid throughout the leg-pair 430. Although FIG. 6 shows hydraulic pressure sensor(s) 456 on the central node 450, additional hydraulic pressure sensor(s) 456 may be positioned at other locations on the leg-pair 430. To monitor and control the hydraulic power delivered to the leg-pair 430, the control system 418 receives sensor data from the pressure sensor(s) 456.

As illustrated in FIGS. 5-6, the central node 450 also includes a quick-connect electrical connector 458 that may be removably coupled to the control system 418 via a corresponding electrical connector 421. The electrical connectors 421, 458 can act as communication interfaces that enable wired communication of information, such as sensor data from the hydraulic pressure sensor(s) 456, between the leg-pair 430 and the control system 418.

In general, the electrical connector 458 may couple any electric/electronic components of the leg-pair 430 to the control system 418. Connections, such as wires or cables, from these electric/electronic components terminate at one or more conducting elements in the electrical connector 458. The one or more conducting elements organize the connections from the respective electric/electronic components so that they can be easily coupled to corresponding conducting elements for the control system 418.

A cable may be employed to couple the electrical connector 458 to the electrical connector 421 for the control system 418. Alternatively, the electrical connector 458 may be attached directly to the electrical connector 421 for the control system 418. The electrical connectors 421, 458 may employ any combination of pin connectors, jack connectors, axial connectors, plugs, board-to-board connectors, a wire-to-board connectors, or the like.

In addition to establishing data communications between the leg-pair 430 and the control system 418, the electrical connector 458 can also be employed to deliver electrical power from the power source(s) 414 to electrical components of the leg-pair 430. For instance, the hydraulic pressure sensor(s) 456 may receive electric power by way of the the electrical connector 458 Using the single electrical connector 458 for both data and power delivery facilitates the process of assembling the robot 400. In alternative embodiments, however, more than one electrical connector may be employed, and electric power can be received through one or more separate electrical connectors.

The legs 432A, 432B may also be produced separately as modular components and subsequently coupled to the central node 450 to produce the leg-pair 430. As described above, each leg 432A, 432B may include one or more members connected by joints and configured to operate with various degrees of freedom with respect to one another. Employing a modular approach, the end points of the members may be contained entirely in each respective leg 432A, 432B and machined with high accuracy and tight tolerances relative to each other. As a result, the legs 432A, 432B can operate with high precision.

FIG. 7 illustrates the leg-pair 430, where the second leg 432B has not yet been coupled to the central node 450. The central node 450 may include an attachment mechanism 460 that engages the leg 432B. The attachment mechanism 460 allows the leg 432B to be easily coupled to, and decoupled from, the central node 450. The attachment mechanism 460 also provides a secure coupling that allows the leg 432B to move and support the body 424 as a part of the leg-pair 430. As shown in FIG. 7, for instance, the attachment mechanism 460 may include a plurality of apertures 462 arranged on a circular flange 464. The circular flange 464 may engage a corresponding structure on the leg 432B so that the apertures 462 align with corresponding apertures on the leg 432B. The apertures may receive fasteners, such as bolts, screws, pins, or the like, to removably couple the leg 432B to the central node 450.

To allow hydraulic operation of the legs 432A, 432B, the central node 450 may also include a hydraulic connector 466 that hydraulically couples the leg 432B to the central node 450. As FIG. 7 also illustrates, the hydraulic connector 466 includes a cylindrical chamber 468. The circular flange 464 is disposed along the periphery of the cylindrical chamber 468. As such, when the leg 432B is coupled to the circular flange 464 with fasteners, the leg 432B inserts a corresponding cylindrical structure (not shown) into the cylindrical chamber 468. A rotary union is employed to allow hydraulic fluid to apply pressure in the leg 432B by way of the cylindrical chamber 468. In particular, slip rings 470 are employed to create channels 472 along the inner walls of cylindrical chamber 468. The channels 472 align with inlets in the cylindrical structure of the leg 432B when the cylindrical structure is inserted into the cylindrical chamber 468. The hydraulic fluid fills the channels 472 and applies pressure through the inlets into hydraulic components in the leg 432B. The hydraulic fluid allows power from the hydraulic system 422 to be delivered by way of the central node 450 to the leg 432B.

When the robot 400 carries out a gait, the leg 432B may rotate relative to the central node 450. Advantageously, the channels 472 maintain a hydraulic connection with the inlets leading into the leg 432B even when the leg 432B rotates relative to the central node 450. In other words, the rotary union helps to maintain the hydraulic pressure applied to the leg 432B while the leg 432B moves. The hydraulic connector 466 may also include one or more valve mechanisms to prevent hydraulic fluid from leaking during coupling or decoupling.

The central node 450 may also include an electrical connector 474 that may be removably coupled to a corresponding electrical connector for the leg 432B. As such, electric power from the electric power source 420 may be delivered, by way of the central node 450, to electric/electronic components in the leg 432B. Additionally, information may be communicated, via the central node 450, between the electric/electronic components in the leg 432B and the control system 418. For instance, sensors, such as hydraulic pressure sensors, can receive electric power and communicate sensor data over the electric connection.

A single cable can extend between the electrical connector 474 of the central node 450 and an electrical connector (not shown) of the leg 432B. In other embodiments, however, the electrical connector 474 may be attached directly to the electrical connector of the leg 432B without a cable. The electrical connectors may employ any combination of pin connectors, jack connectors, axial connectors, plugs, board-to-board connectors, a wire-to-board connectors, or the like. In some embodiments, more than one electric connection may be employed.

Due to the modular assembly of the leg-pair 430, the legs 432A, 432B may be easily coupled to, or decoupled from, the central node 450 while the central node 450 remains coupled to the frame 436. For instance, the second leg 432B can be easily decoupled from the central node 450 for maintenance or repair and easily coupled again to the central node 450 as described with reference to FIG. 7. Alternatively, a replacement leg can be coupled to the central node 450 in place of the second leg 432B. Advantageously, it is unnecessary to remove the entire leg-pair 430 to attend to one of the legs 432A, 432B.

Referring again to FIG. 4, the leg-pairs 430, 440 may have substantially similar operating characteristics. For instance, the leg-pairs 430, 440 may have substantially similar structure, load-bearing capabilities, range of motion, and kinematic properties. As such, when the leg-pairs 430, 440 are coupled to the body 424, the robot 400 may operate in a mode where a load is evenly balanced between both leg-pairs 430, 440 and the leg-pairs 430, 440 move according to a similar gait.

Alternatively, the first leg-pair 430 may have different operating characteristics than the second leg-pair 440. For instance, the leg-pairs 430, 440 may have different structure, load-bearing capabilities, range of motion, and/or kinematic properties. In this case, the robot 400 is configured to account for the differences in operating characteristics between the leg-pairs 430, 440.

For instance, load sharing between dissimilar leg-pairs 430, 440 may be customized according to the operating characteristics of each leg-pair 430, 440. The robot 400 may be configured so that the stronger leg-pair bears a greater load. Additionally, the robot 400 may be configured to direct loading forces toward stronger leg joints and away from weaker leg joints. The robot 400 may also be reconfigured over time to modify load sharing due to any sensed mechanical failure or fatigue or other changes to the robot 400.

Figure 8:
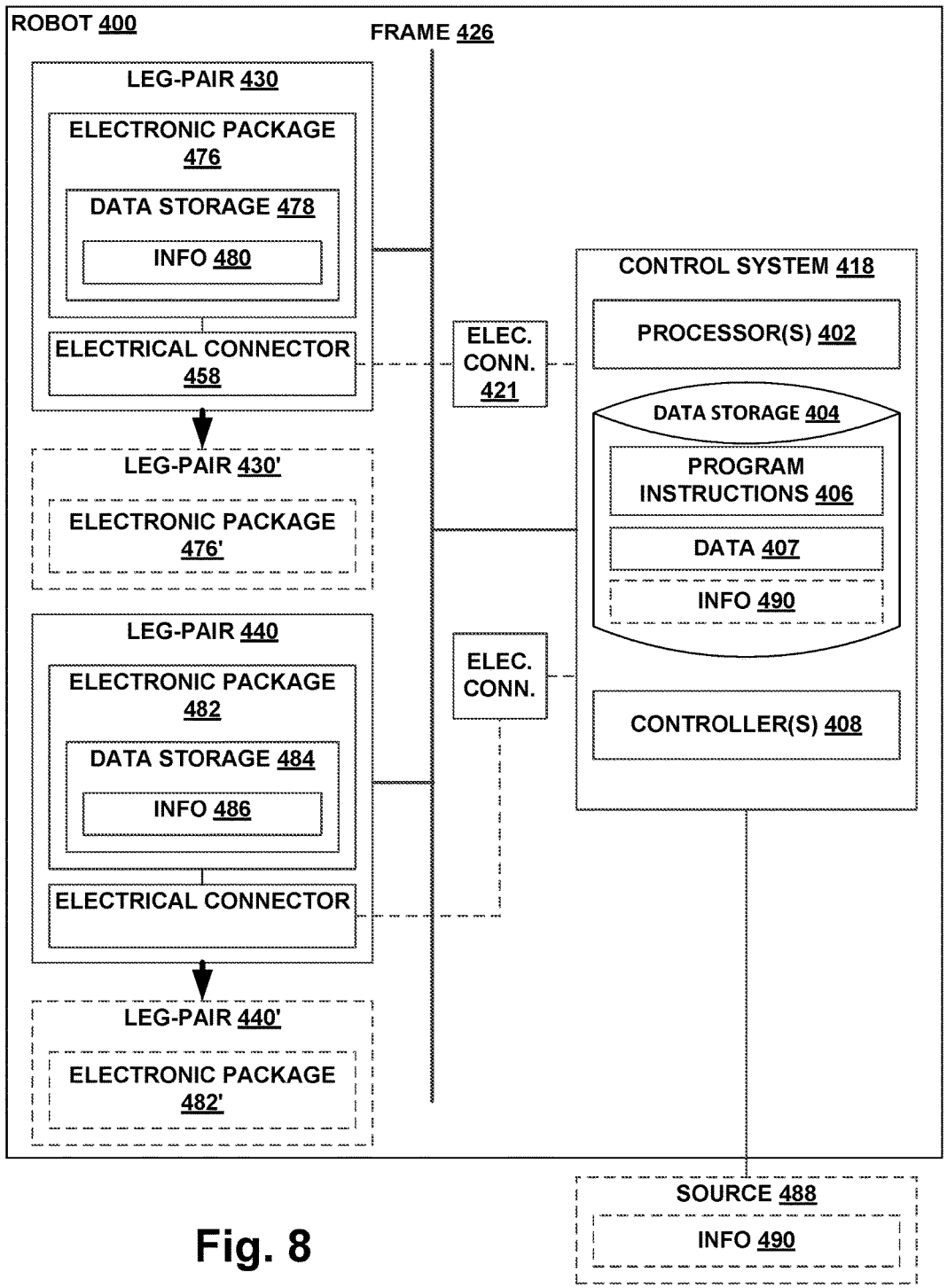
FIG. 8 illustrates further aspects of a quadruped robot wherein a control system receives information on modular leg-pairs coupled to the robot assembly according to an example implementation.

The modular approach for assembling the robot 400 allows the robot 400 to be reconfigured with different types of leg-pairs. For instance, as shown in FIG. 8, the first leg-pair 430 may be replaced with a replacement leg-pair 430' having different operating characteristics, and the second leg-pair 440 may be replaced with a replacement leg-pair 440' having different operating characteristics. The replacement leg-pairs 430', 440' may be able to support different loads, provide different range of motion, move at different speeds, and/or provide different gaits for the robot 400. The first replacement leg-pair 430' and the second replacement leg-pair 440' may have substantially similar operating characteristics. Alternatively, the first replacement leg-pair 430' may have operating characteristics that are different from those of the second replacement leg-pair 440'.

Because the robot 400 can be reconfigured to use leg-pairs having desired characteristics, the modular approach allows a robot to be customized for a specific job. For instance, the robot 400 may be reconfigured with lightweight but weaker leg-pairs to make the robot 400 more efficient and faster for scouting purposes. Alternatively, the robot 400 may be reconfigured with heavier but stronger leg-pairs to allow the robot 400 to carry a large load.

The control system 418 can control the operation of the leg-pairs 430, 440 to move the robot 400 along a surface. Because different types of leg-pairs can be employed, however, the control system 418 can identify what type of leg-pairs are coupled to the body 424 to control their operation. In addition, the control system 418 can determine the operating characteristics of the leg-pairs coupled to the body 424.

As shown in FIG. 8, the leg-pair 430 includes an electronic package 476. The electronic package 476 includes data storage 478 that stores information 480. The data storage 478 may be similar to the data storage 104 described above. The information 480 may include information relating to the leg-pair 430 and the operation of the legs 432A, 432B. For instance, the information 480 may provide kinematic information, calibration data, motion limits, and/or strength limits relating to the operation of the legs 432A, 432B. These may include any combination of configuration data, operational data, and/or program code.

The electronic package 476 may be coupled to the electrical connector 458. Additionally, the electrical connector 458 may be removably coupled to the control system 418 by way of the electrical connector 421. Thus, the electronic package 460 may be communicatively coupled to the control system 418. When the leg-pair 430 is physically coupled to the body 424 and the electrical connectors 421, 458 are coupled, the control system 418 can detect the leg-pair 430. For instance, when the electrical connectors 421, 458 are coupled, the control system 418 may receive a signal from the resulting closed circuit.

In response, the control system 418 may receive the information 480 stored on the data storage 478. Using the information 480, the control system 418 can identify the type of leg-pair 430 and configure the operation of the robot 400 according to the operating characteristics of the leg-pair 430. The information 480 may also include passwords, codes, keys, or the like to allow the control system 418 to authenticate the leg-pair 430 and prevent the use of incompatible or unauthorized leg-pairs.

The control system 418 may actively access the data storage 478 and read the information 480. Alternatively, the control system 418 may communicate with processor(s) and/or controller(s) in the electronic package 476 to request and receive the information 418.

As shown in FIG. 8, the leg-pair 440 also includes an electronic package 482 with data storage 484 that stores information 486 relating to the leg-pair 440. As such, the control system 418 can also identify the leg-pair 440 and further configure the operation of the robot 400 according to the operating characteristics of the leg-pair 440.

When configuring the operation of the robot 400 according to the operating characteristics of the leg-pairs 430, 440, the control system 418 may provide varying levels of instructions or other signals to operate the leg-pairs 430, 440. In some cases, the control system 418 provides precise instructions that dictate how each leg-pair 430, 440 should move. The control system 418 may be primarily responsible for determining the physical movement of each leg-pair 430, 440. For instance, the control system 418 chooses the path that each leg-pair 430, 440 should take to place its respective feet 434A-B, 444A-B at particular positions.

In other cases, however, the control system 418 may provide instructions that provide each leg-pair 430, 440 with some autonomy in determining how to move. For instance, the control system 418 may request each leg-pair 430, 440 to provide a particular vertical force or to place its respective feet 434A-B, 444A-B at particular positions. In response, the processor(s) and/or controller(s) in the respective electronic packages 476, 482 of the leg-pairs 430, 440 can determine how to meet the request. For instance, each leg-pair 430, 440 can choose its own path to place its respective feet 434A-B, 444A-B at the requested positions.

When the leg-pairs 430, 440 are replaced with the replacement leg-pairs 430', 440', similar electronic packages 476', 482' allow the control system 418 to identify the leg-pairs 430', 440' and reconfigure the operation of the robot 400 according to the operating characteristics of the replacement leg-pairs 430', 440'.

To configure the operation of the robot 400, the control system 418 may also receive information 490 from secondary source(s) 488 as shown in FIG. 8. The secondary source(s) 488 may include a database stored on the data storage 404. Alternatively or additionally, the secondary source(s) 488 may include a database stored on an external system which is communicatively coupled to the control system 418. The external system may be an external server device (e.g., cloud storage) accessible by way of a network, such as the Internet. In general, the control system 418 may access information that is stored by any number of sources, such as the electronic packages 476, 482, the data storage 404, the secondary source(s) 488, etc.

In some cases, the control system 418 identifies the leg-pairs 430, 440 from the information 480, 486 stored on the electronic packages 476, 482, respectively, and may receive further information 490 on the operating characteristics of the leg-pairs 430, 440 from the secondary source(s) 488. For instance, each electronic package 476, 482 may provide a serial number for each respective leg-pair 430, 440, and the control system 418 can use the serial numbers to cross-reference additional information 490 from the secondary sources 488.

Once the control system 418 has identified each leg-pair 430, 440 and determined the operating characteristics for each leg-pair 430, 440, the control system 418 may access a motion library to determine a motion template for determining an appropriate gait for the robot 400 for a specific job. For instance, the control system 418 may determine that with the four legs 432A, 432B, 442A, 442B and a heavy load, the robot 400 may employ a crawl gait, where one leg moves at a time.

When determining an appropriate gait for the robot 400, the control system 418 may eliminate some possible gaits based on the operating characteristics of the legs 432A, 432B, 442A, 442B. For instance, the legs 432A, 432B, 442A, 442B may not be able to accommodate a run gait due to their kinematics, motion and strength limits, etc. As such, the control system 418 may fall back to a gait that provides the greatest possible speed with the legs 432A, 432B, 442A, 442B.

Figure 9A:
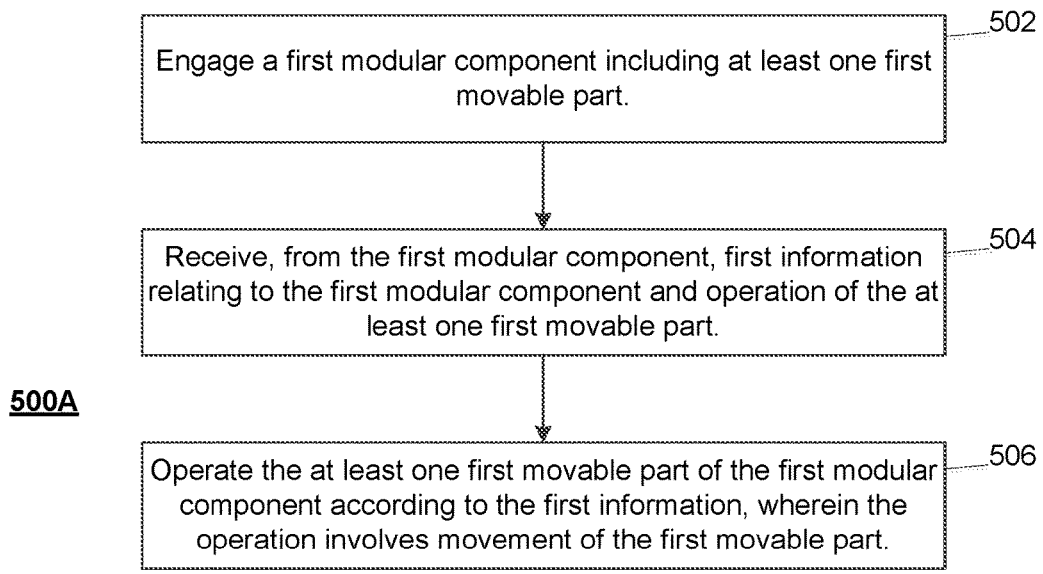
FIG. 9A illustrates a method for operating a robot assembled from modular components according to an example implementation.

FIG. 9A illustrates an example method 500A for operating a robot assembled with modular components. In particular, in act 502, a first modular component is engaged by way of a first attachment mechanism on a body of a robot. The first modular component includes at least one first movable part operable to move relative to the body when the first modular component is attached to the body. In act 504, first information is received from the first modular component and by way of a first communication interface coupled to the body of the robotic system. The first information relates to the first modular component and operation of the at least one first movable part. In act 506, the robot operates the at least one first movable part of the first modular component according to the first information, where the operation involves movement of the first movable part of the first modular component.

Figure 9B:
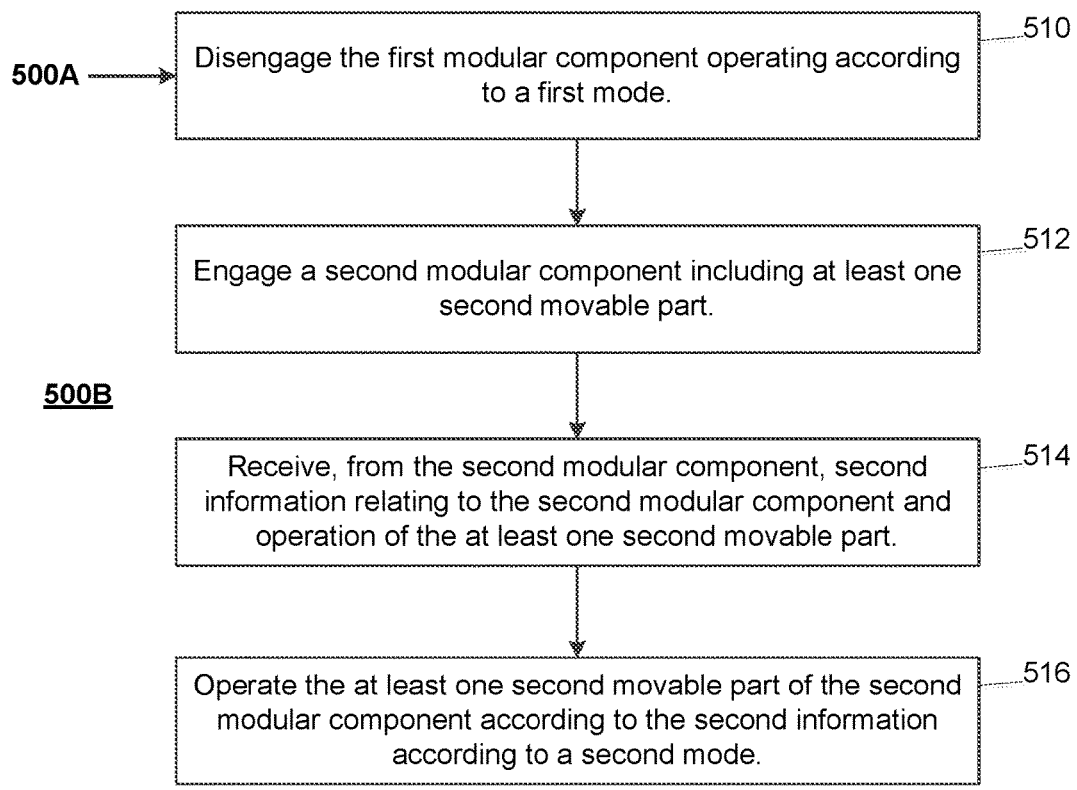
FIG. 9B illustrates a method for further operating a robot assembled from modular components according to an example implementation.

As shown in FIG. 9B, when the first modular component operates according to a first mode according to method 500A, an additional method 500B may include act 510 where the first modular component is disengaged from the first attachment mechanism. Additionally in act 512, a second modular component is engaged by way of the first attachment mechanism. The second component includes at least one second movable part operable to move relative to the body when the second modular component is attached to the body. Also, in act 514, second information is received from the second modular component and by way of the first communication interface. The second information, relates to the second modular component and operation of the at least one second movable part. Furthermore, in act 516, the robot operates the at least one second movable part of the second modular component according to the second information, wherein the second modular component operates according to a second mode that is different from the first mode.

Figure 9C:
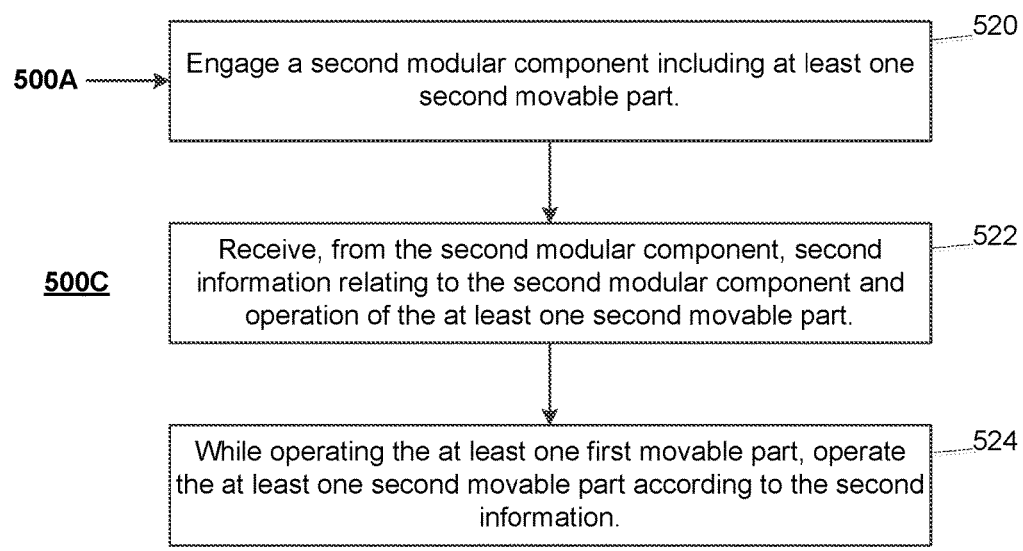
FIG. 9C illustrates a method for further operating a robot assembled from modular components according to an example implementation.

As shown in FIG. 9C, when the first modular component operates according to a first mode according to method 500A, an additional method 500C may include act 520, a second modular component is engaged by way of a second attachment mechanism on the body of the robotic system. The second modular component includes at least one second movable part operable to move relative to the body when the second modular component is attached to the body. Additionally in act 522, second information is received from the second modular component and by way of a second communication interface. The second information relates to the second modular component and operation of the at least one second movable part. Furthermore, in act 524, the robot operates the at least one second movable part according to the second information, while operating the at least one first movable part.

Although the example modular robot described above may be a quadruped robot, it is understood that other robot systems may employ any number of legs. Indeed, the modular approach described above may allow some robots to add leg-pairs dynamically. For instance, a robot may allow up to n leg-pairs to be added and the control system detects the number of electric connections to determine the number of leg-pairs. Further, the modular components may be delivered in a disassembled state and a subset of the modular components may be selectively assembled to produce a robot that is customized for a specific use. For instance, a total of n leg-pairs may be delivered, but the robot may be selectively assembled to include fewer than n leg-pairs.

In addition, it is understood that the modular components are not limited to leg-pairs. For instance, a robot may also include one or more arm(s) that can be produced separately as modular components and subsequently assembled to produce the robot. The arm may be coupled mechanically, hydraulically, and/or electronically in a manner similar to the leg-pairs above. In general, many different aspects of a robot may be implemented as modular components as described above.

Although example robot described above may be configured according to information provided by the leg-pairs, it is understood that other modular components, such as the legs, may also communicate information to the control system in a similar manner to configure the robot according to the characteristics of these other modular components.

Although the example robot described above may employ fasteners to removably couple modular components to other parts of the robot, it is understood that other attachment mechanisms may be employed. Additionally or alternatively, modular components may be removably coupled to other parts of the robot with locking joints, ball lock bolts, or the like. Additionally or alternatively, modular components may be removably coupled to other parts of the robot by threaded engagement, interference fit, snap fit, or other frictional engagement. Additionally or alternatively, modular components may be removably coupled to other parts of the robot with a quick-release system, such as quick-release levers, quick-release hubs, or the like.

Although the example robot described above may employ electrical connectors to communicatively couple modular components to other parts of the robot, it is understood that information may be communicated to/from modular components according to other approaches. In alternative embodiments, for instance, information may be communicated over a fiber-optic connection. In other embodiments, information may be communicated over wireless communications, such as short-wavelength radio waves (e.g., BLUETOOTH®, WI-FI™), any type of network (e.g., personal area network (PAN)), etc.

Although the example robot described above may include the power source 414 (e.g., the electrical power source(s) 420, the hydraulic system 422) coupled to the frame 426, power sources in alternative embodiments may be incorporated into the modular components (e.g., the leg-pairs 430, 440). For instance, each leg-pair 430, 440 may include an onboard hydraulic pump or electric power source to power the movement of the respective legs 432A-B, 442A-B.

IV. Conclusion

In view of the foregoing, components for a robot may be produced separately as individual modular units and subsequently assembled to produce the robot. Such components may include, for instance, a control system, a sensor head, power sources (e.g., a hydraulic system), legs, and leg-pair assemblies. A modular approach allows each component to be more accurately produced and to be subject to separate quality assurance (QA) processes. Additionally, a modular approach allows a robot to be customized for specific jobs, because the robot can be easily modified to use modular components having desired characteristics.

Attachment mechanisms allow the modular components to be easily coupled to, or decoupled from, other parts of the robot assembly. In addition, connectors allow electric, hydraulic, and/or other connections to be easily established between the modular components and other parts of the robot assembly.

Once the modular components have been assembled to produce the robot, the modular components can be easily removed from the robot assembly for maintenance, repair, and/or replaced. In some cases, system faults can be more easily isolated to a particular modular component. The faulty modular component can be easily removed from the robot assembly and then repaired or replaced with another working modular component. Furthermore, instead of shipping the entire robot for repair, the faulty modular component can be shipped separately for repair.

When a modular component is replaced, a control system for the robot can identify the replacement modular component and configure the operation of the robot according to the characteristics of the replacement modular component.

The above detailed description describes various features and functions of the disclosed systems, devices, and methods with reference to the accompanying figures. In the figures, similar symbols typically identify similar components, unless context indicates otherwise. The illustrative implementations described in the detailed description, figures, and claims are not meant to be limiting. Other implementations can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block and/or communication may represent a processing of information and/or a transmission of information in accordance with example implementations. Alternative implementations are included within the scope of these example implementations. In these alternative implementations, for example, functions described as steps, blocks, transmissions, communications, requests, responses, and/or messages may be executed out of order from that shown or discussed, including in substantially concurrent or in reverse order, depending on the functionality involved. Further, more or fewer steps, blocks and/or functions may be used with any of the message flow diagrams, scenarios, and flow charts discussed herein, and these message flow diagrams, scenarios, and flow charts may be combined with one another, in part or in whole.

A step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by a processor for implementing specific logical functions or actions in the method or technique. The program code and/or related data may be stored on any type of computer-readable medium, such as a storage device, including a disk drive, a hard drive, or other storage media.

A computer-readable medium may include non-transitory computer-readable media such as computer-readable media that stores data for short periods of time like register memory, processor cache, and/or random access memory (RAM). The computer-readable media may also include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media may also be any other volatile or non-volatile storage systems. A computer-readable medium may be considered a computer-readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims.

What is claimed is:

1. A robotic system comprising:
a body;
a modular component including at least one moveable part, the at least one movable part having a corresponding cylindrical component;
a node coupled to the body and comprising:
at least one attachment mechanism, the at least one attachment mechanism configured to removably couple the modular component to the node; and
a hydraulic connector configured to hydraulically couple the modular component to the node when the modular component is coupled to the node, the hydraulic connector including a cylindrical chamber configured to receive the corresponding cylindrical component of the at least one movable part and deliver hydraulic power for rotating the at least one movable part relative to the body, the hydraulic connector including slip rings disposed within the cylindrical chamber to provide a rotary union between the hydraulic connector and the corresponding cylindrical component of the at least one movable part, the rotary union allowing the corresponding cylindrical component of the at least one movable part to rotate about a longitudinal axis of the cylindrical chamber;
a communication interface coupled to the body and configured to be communicatively coupled to the modular component to receive, from the modular component, information relating to the modular component and operation of the at least one movable part; and
a control system coupled to the body and the communication interface, wherein the control system is configured to:
in response to the modular component being attached to the body by way of the node and the at least one attachment mechanism, receive, by way of the communication interface, the information from the modular component, and
deliver the hydraulic power through the hydraulic cylindrical chamber of the hydraulic connector to operate the at least one movable part based on the received information.

2. The robotic system of claim 1, wherein the information from the modular component includes at least one of kinematic information, calibration data, motion limits, or strength limits relating to the operation of the at least one movable part.

3. The robotic system of claim 1, wherein the at least one movable part includes a leg operable to move the body relative to a surface or an arm operable to manipulate an object or carry a load, and wherein the control system is configured to operate the leg or the arm according to the information from the modular component.

4. The robotic system of claim 1, wherein the at least one attachment mechanism includes a plurality of attachment mechanisms configured to removably couple a plurality of respective modular components to the body, the plurality of modular components including a plurality of respective moveable parts operable to move relative to the body when the plurality of modular components are attached to the body, and wherein the control system is configured to operate the plurality of movable parts relative to each other according to the information from the plurality of modular components.

5. The robotic system of claim 4, wherein the plurality of modular components includes at least a first modular component including a first pair of legs and a second modular component including a second pair of legs, wherein the information from the first modular component includes first limits for the operation of the first pair of legs, the information from the second modular component includes second limits for the operation of the second pair of legs, the second limits being different from the first limits, and wherein the control system is configured to operate the first pair of legs and the second pair of legs according to the first limits and the second limits, respectively.

6. The robotic system of claim 1, further comprising a hydraulic power source, wherein the hydraulic power source is coupled to the hydraulic connector of the node, and wherein the hydraulic power source is configured to provide, by way of the hydraulic chamber of the hydraulic connector when the modular component is coupled to the node via the at least one attachment mechanism, the hydraulic power for the operation of the at least one movable part.

7. The robotic system of claim 1, wherein the communication interface includes an electric or optical connection or wireless connection configured to be removably coupled to the modular component, and wherein the communication interface is configured to receive communication of the information from the modular component by way of the electric or optical connection or the wireless connection.

8. The robotic system of claim 1, further comprising a power source, wherein the body includes an electric connection configured to be removably connected to the modular component, and the power source is configured to provide, by way of the electric connection, electric power for the operation of the at least one movable part.

9. The robotic system of claim 1, wherein the at least one attachment mechanism is configured to alternately attach the modular component and a second modular component to the body, wherein the control system is configured to:
in response to the modular component being attached to the body by way of the at least one attachment mechanism, operate the at least one respective movable part of the modular component to provide an operational mode for the robotic system, and
in response to the second modular component being attached to the body by way of the at least one attachment mechanism, operate at least one respective movable part of the second modular component to provide a second operational mode for the robotic system, the second operational mode being different from the operational mode.

10. The robotic system of claim 1, further comprising a data storage communicatively coupled to the control system, wherein the control system receives, from the data storage, additional information for the operation of the at least one movable part.

11. The robotic system of claim 1, wherein the robotic system has access to a database representing modular components, and wherein the control system is further configured to:
look up the information in the database to identify the modular component, wherein delivering the hydraulic power to operate the at least one movable part of the modular component based on the received information comprises the hydraulic power causing the at least one movable part of the modular component to move based on the identity of the modular component.

12. The robotic system of claim 11, wherein the database is disposed upon a server device communicatively coupled to the robotic device by way of a network, and wherein looking up the information in the database to identify the modular component comprises:
transmitting, to the server device, a representation of the information; and
receiving, from the server device, a representation of the identity of the modular component.

13. The robotic system of claim 1, further comprising:
a power source modularly coupled to the body and the modular component, wherein the power source is configured to provide power for the operation of the at least one movable part; and
a sensor system modularly coupled to the body and the control system, wherein the sensor system is configured to provide the control system with information relating to the robotic system's environment or operation of the robotic system.

14. A modular component comprising:
an attachment mechanism configured to removably couple the modular component to a node of a robotic system, the node coupled to a body of the robotic system;
at least one movable part operable to rotate relative to the body of the robotic system when the modular component is coupled to the node, the at least one moveable part including a corresponding cylindrical component;
a first hydraulic connector configured to hydraulically couple the modular component to the node when the modular component is coupled to the node, the first hydraulic connector including a cylindrical chamber configured to receive the corresponding cylindrical component of the at least one movable part and deliver hydraulic power for rotating the at least one movable part relative to the body of the robotic system, the first hydraulic connector including slip rings disposed within the cylindrical chamber to provide a rotary union between the first hydraulic connector and the corresponding cylindrical component of the at least one movable part, the rotary union allowing the corresponding cylindrical component of the at least one moveable part to rotate about a longitudinal axis of the cylindrical chamber; and
a communication interface configured to be communicatively coupled to the robotic system, wherein the modular component is configured to:
in response to being attached to the body of the robotic system, transmit, by way of the communication interface, information relating to the modular component and operation of the at least one movable part to the body of the robotic system; and
receive, by way of the hydraulic chamber of the first hydraulic connector, hydraulic power from the body of the robotic system to operate the at least one movable part.

15. The modular component of claim 14, wherein the at least one movable part includes a leg removably coupled to the node, the leg operable to move the body of the robotic system relative to a surface.

16. The modular component of claim 15, further comprising a second hydraulic connector configured to be removably coupled to a hydraulic power system of the robotic system, wherein the leg is hydraulically operated by the robotic system by way of the first hydraulic connector and the second hydraulic connector.

17. The modular component of claim 15, wherein the node includes:
a first electric connection configured to be removably coupled to a power source of the robotic system; and
a second electric connection configured to be removably coupled to the leg, wherein the leg receives power from the power source by way of the first electric connection and the second electric connection.

18. A method comprising:
engaging, by way of a first attachment mechanism on a node of a robotic system, a first modular component including at least one first movable part operable to rotate relative to a body of the robotic system when the first modular component is coupled to the node;
hydraulically coupling, by way of a hydraulic connector of the node, the first modular component to the node when the first modular component is coupled to the node, the hydraulic connector including a cylindrical chamber configured to receive a corresponding cylindrical component of the at least one first movable part and deliver hydraulic power for rotating the at least one first movable part relative to the body of the robotic system, the hydraulic connector including slip rings disposed in the cylindrical chamber to provide a rotary union between the hydraulic connector and the corresponding cylindrical component of the at least one first movable part, the rotary union allowing the corresponding cylindrical component of the at least one movable part to rotate about a longitudinal axis of the cylindrical chamber;
receiving, from the first modular component and by way of a first communication interface coupled to the body of the robotic system, first information relating to the first modular component and operation of the at least one first movable part; and
delivering, by the robotic system, the hydraulic power through the hydraulic cylindrical chamber of the hydraulic connector to operate the at least one first movable part of the first modular component based on the received first information.

19. The method of claim 18, wherein the first modular component operates according to a first mode, the method further comprising:
disengaging the first modular component from the first attachment mechanism;
engaging, by way of the first attachment mechanism, a second modular component including at least one second movable part operable to move relative to the body when the second modular component is attached to the body;

receiving, from the second modular component and by way of the first communication interface, second information relating to the second modular component and operation of the at least one second movable part; and operating, by the robotic system, the at least one second movable part of the second modular component according to the second information, wherein the second modular component operates according to a second mode that is different from the first mode.

20. The method of claim 18, further comprising:

engaging, by way of a second attachment mechanism on the body of the robotic system, a second modular component including at least one second movable part operable to move relative to the body when the second modular component is attached to the body;

receiving, from the second modular component and by way of a second communication interface, second information relating to the second modular component and operation of the at least one second movable part; and while operating the at least one first movable part, operating, by the robotic system, the at least one second movable part according to the second information.

* * * * *